Jan. 3, 1950  E. F. COMSTOCK  2,493,619
MACHINE FOR SHARPENING THE KNIVES OF LAWN MOWERS
Filed May 6, 1946  4 Sheets-Sheet 1
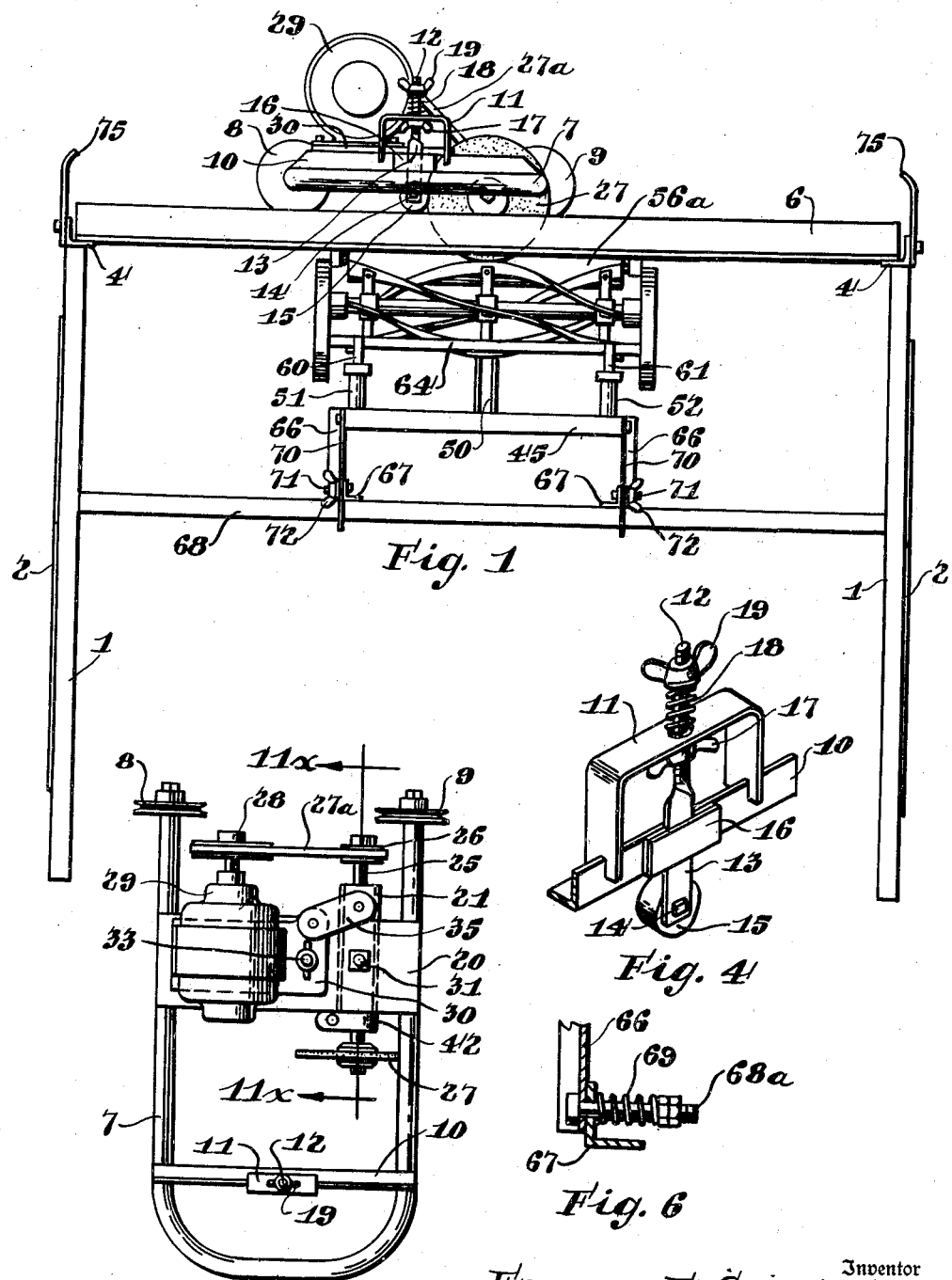
Inventor
Eugene F. Comstock
By Frank Keiper
Attorney

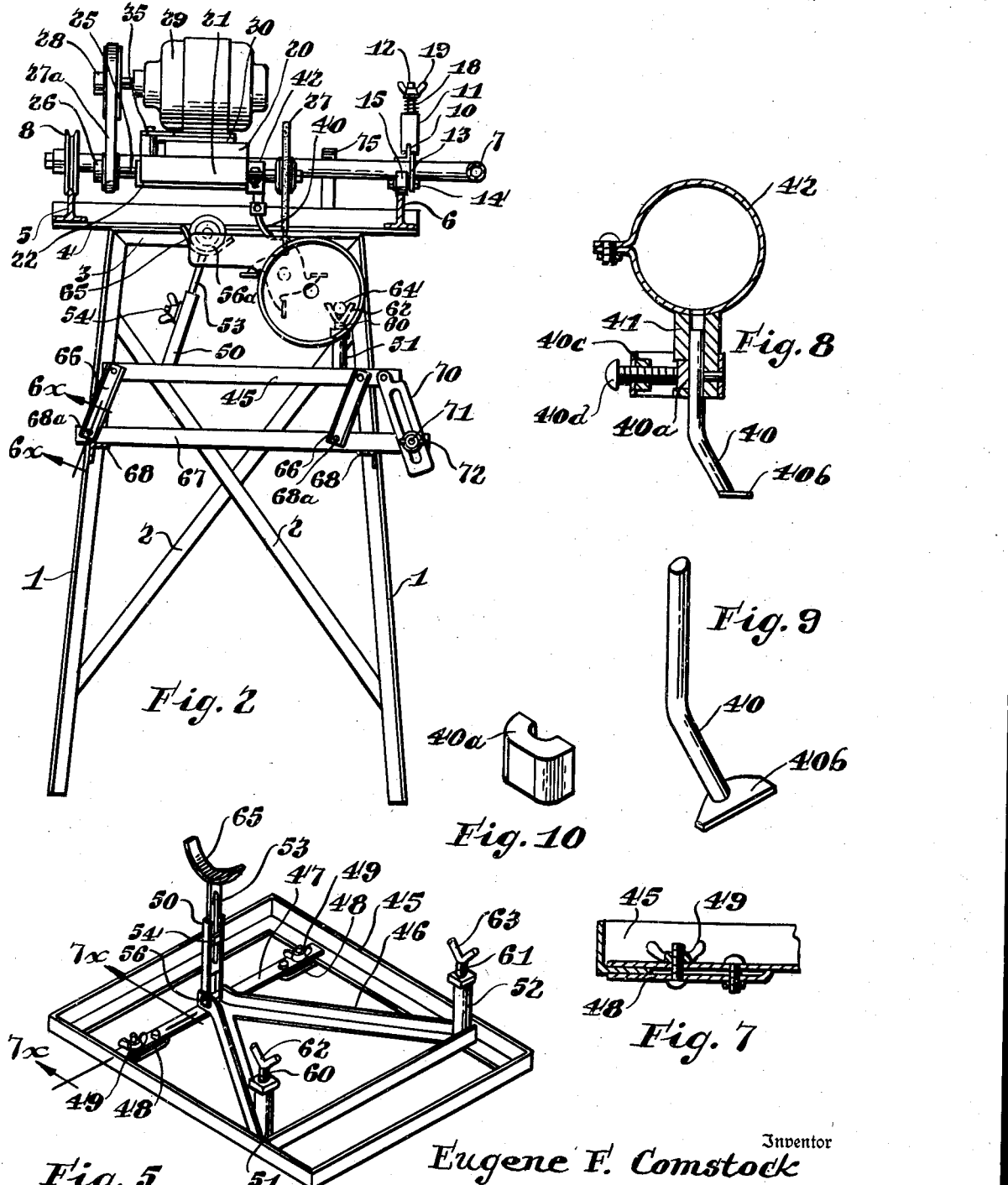

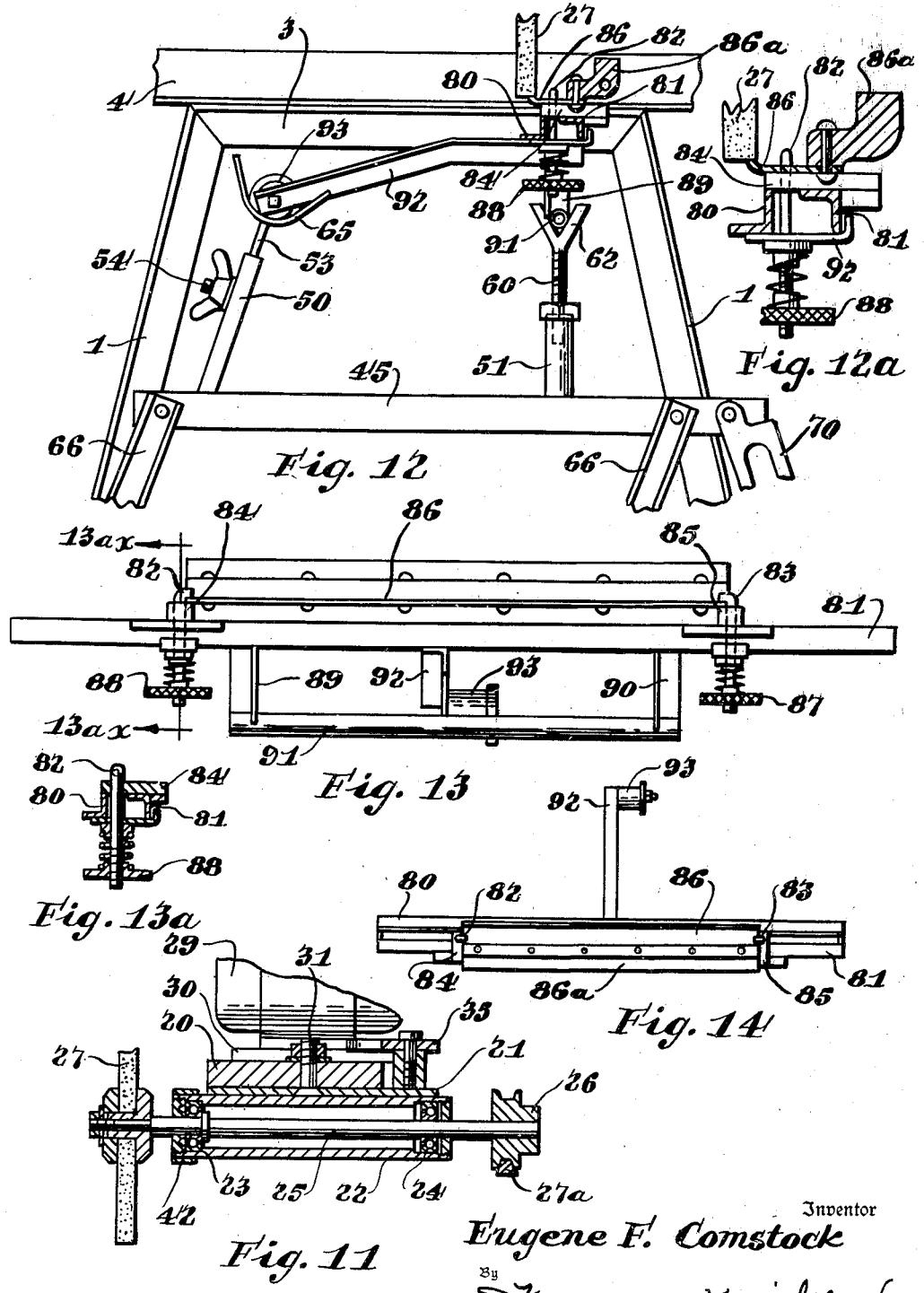

Jan. 3, 1950     E. F. COMSTOCK     2,493,619
MACHINE FOR SHARPENING THE KNIVES OF LAWN MOWERS
Filed May 6, 1946     4 Sheets-Sheet 4

Inventor
Eugene F. Comstock
By Frank Keifer
Attorney

Patented Jan. 3, 1950

2,493,619

UNITED STATES PATENT OFFICE 2,493,619

MACHINE FOR SHARPENING THE KNIVES OF LAWN MOWERS

Eugene F. Comstock, Rochester, N. Y.

Application May 6, 1946, Serial No. 667,656

7 Claims. (Cl. 51—34)

The object of this invention is to provide a machine that will sharpen both the stationary and the revolving cutting blades of a lawnmower.

Another object of the invention is to build the machine so that the lawnmower minus a handle can be held in the machine while the rotating blades are being sharpened.

Another object of the invention is to sharpen and trim the blades evenly from one end of the revolving cylinder to the other.

Another object of the invention is to grind the blades with the correct bevel.

Another object of the invention is to grind both the stationary and the revolving blades with the same grind stone which stone revolves on an axis that is transverse to the axis of the cylinder of the lawnmower.

Another object of the invention is to provide a jig that will hold the stationary blade of a lawnmower in this same machine while it is being ground, it being understood that the stationary blade is removed from the frame of the lawnmower for the purpose of grinding it.

These and other objects of the invention will be illustrated in the drawings, described in the specification and pointed out in the claims at the end thereof.

In the drawings:

Figure 1 is a side elevation of the machine.

Figure 2 is an end elevation of the machine looking at it from the lefthand end of Figure 1.

Figure 3 is a top plan view of the carriage which travels on top of the frame of the machine as shown in Figures 1 and 2.

Figure 4 is a perspective view of the bracket that forms part of the carriage shown in Figure 3.

Figure 5 is a perspective view of the frame that supports the lawnmower while the knives on the cylinder are being ground.

Figure 6 is a sectional view taken on the line $6x$, $6x$ of Figure 2 showing one of the four adjusting elements by which the frame shown in Figure 5 is supported.

Figure 7 is a section on the line $7x$, $7x$ of Figure 5 that shows one of the clamps that holds the triangular frame shown in Figure 5 stationary in the rectangular frame of Figure 5.

Figure 8 is a detail view of a bracket and finger carried on the carriage shown in Figure 3 which rotates and holds the curved blades in position while the grinding wheel travels along the blade.

Figure 9 is a detail perspective view of the finger shown in Figure 8.

Figure 10 is a perspective view of the locking key shown in section in Figure 8 for the purpose of holding the finger shown in Figure 9 in correct position.

Figure 11 is a sectional view taken on the line $11x$, $11x$ of Figure 3 showing the pivot on which the shaft of the grinding wheel can swing so as to place the grinding wheel at the correct angle to the cutting edge of the knife that is to be sharpened.

Figure 12 shows an end elevation of the machine partly broken away, the showing being on a larger scale than that shown in Figure 2; also showing the support in which the stationary blade is held while the cutting edge is being ground.

Figure 12a is an enlarged detail view of a portion of Figure 12 showing the stationary knife and the casting to which it is attached in position for grinding.

Figure 13 is a front elevation of the frame that supports the stationary blade while it is being ground as the frame appears in looking at Figure 12 from the right.

Figure 13a is a sectional view through the clamp that holds the stationary knife in position for grinding, the section being taken on the line $13ax$, $13ax$ of Figure 13.

Figure 14 is a top plan view of the frame shown in Figure 13.

In the drawings like reference numerals indicate like parts.

Figure 15:
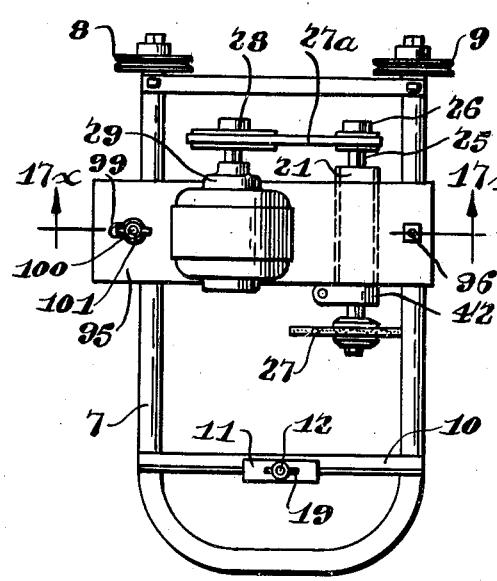
Figure 15 is a top plan view of the carriage shown in Figure 3 with the motor and shaft of the grinding wheel mounted on a single board so that the whole assembly swings together on one pivot.

This grinding machine is supported on a frame which has four legs indicated by reference numerals 1, 1, 1, 1. The two legs at each end are tied together by cross braces 2, 2 and the legs at the top are joined together by a bridge 3. On top of these two bridges is a cross bar 4, 4 at each end of the machine. Supported on these two cross bars are the rails or tracks 5 and 6 which are inverted T bars. On these bars the carriage shown in Figure 3 runs back and forth.

The carriage shown in Figure 3 comprises a U-shaped frame 7 having grooved wheels 8 and 9 at one end of the frame which engage on the track 5. This holds the frame perpendicular to the track as it is moved along the track by hand even when the other end of the frame is lifted as it frequently must be. Near the other end of the frame is a cross bar 10 shown in perspective in Figure 4. On this crossbar is fastened a U-shaped frame 11. In this frame is mounted a bracket which has a threaded end 12 at the top. At the bottom this bracket is flat as shown at 13 and carries a spindle 14 on which is mounted to rotate the roller 15 which rests on the track 6. The flattened end 13 rests against the upright part of the angle 10 and is held in place thereon by a bridge 16 suitably spaced from the upright member 10. This permits the flattened end 13 to be moved up and down and for this purpose, a wing nut 17 is provided on the threaded stem 12 below the yoke of the U-shaped frame 11. Above the yoke is provided a helical spring 18 which is compressed against the yoke by the wing nut 19. By turning the wing nuts 17 and 19 the roller 15 can be held at any desired position. In this way the grinding wheel that will presently be described can be adjusted up and down.

Extending across the U-shaped frame is a board 20 that rests on the two arms of the frame. This board can be fastened to the frame in any suitable manner so that the board and the frame move together along the tracks 5 and 6. Transverse to this board near the right-hand end thereof as shown in Figure 3 is placed a channel 21, the flanges of which extend down and between which the sleeve 22 shown in Figure 11 is held. This sleeve carries the bearings 23 and 24 in which the shaft 25 rotates, which shaft carries the pulley 26 on one end thereof and the grinding wheel 27 clamped on the other end thereof in any suitable manner. The pulley 26 is driven by a belt 27a shown in Figure 3 which in turn is driven by a large pulley 28 carried on the shaft of the motor 29. Resting on the board 20 is a plate 30 on which is supported the motor 29. Passing through the channel 21 and the board 20 is the bolt 31. This bolt does not pass through the plate 30. Passing through the plate 30 and the board 20 is the bolt 33 which acts as a pivot which permits the plate 30 to swing on the board 20 in either direction to grind blades that are either a right or left hand spiral. A link 35 connects the plate 30 to the channel 21 which swings on the bolt 31 as a pivot so that the two parts swing together. The alignment of the belt 27a can be kept on the pulley 26 by moving the pulley 26 on the shaft 25. This permits the grinding wheel 27 to be placed at the correct angle to the bevel on the moving cutting blades of the mower so that they will be correctly ground, and so that the whole surface of the grinding wheel will be used in the grinding, and not merely a narrow zone of it. The U-shaped carriage is moved along the tracks 5 and 6 by hand so that the grinding wheel follows the cutting blade and to keep the cutting blade which is spiral against the grinding wheel, a finger 40 and shoe 40b is used that bears against the back of the cutting blade and holds it in position. This finger is supported in a sleeve 41 which is mounted on a collar 42 that is clamped on the sleeve 22 as is shown in Figures 2, 8 and 11. This finger carries on its bottom a shoe 40b that bears against the spiral blade as the grinding wheel moves along the blade. The finger 40 is clamped in the sleeve 41 by a block 40a shown in Figure 10, the sleeve and block being surrounded by a strap and a nut 40c and screw 40d. This permits the finger 40 to be adjusted up and down or turned on its vertical axis so that the shoe 40b is at the right elevation and bears snugly against the spiral cutting blade. The frame of the lawnmower from which the handle has been removed is set in the frame shown in Figure 5. This frame 45 is rectangular and is made up of angle irons welded together or suitably fastened together. Mounted together is the triangular frame 46. The point of the frame 46 rests on and is fastened to the bridge 47 on each end of which is provided clamps 48, 48 such as are shown in Figure 7. These clamps engage the angles of the frame 45 and can be clamped thereon by the wing nuts 49 at each end of the bridge 47. The outer two corners of the triangular frame 46 rest loosely on the flanges of the frame 45. This permits the frame 46 to be adjusted longitudinally along the frame 45.

On the frame 46 are three upright posts 50, 51 and 52. The post 50 is channel shaped and mounted to slide therein is a slotted bar 53. This slotted bar can be moved up and down in the channel and can be clamped at any elevation therein by the bolt 54. At the top the bar 53 has a saddle or fork 65 on which rests the roller 56a of the lawnmower. The post 50 is pivotally connected at 56 to the frame 46 so that the top of it can be swung forward or back and can also be adjusted up and down.

The posts 51 and 52 are hollow and studs 60 and 61 are mounted to slide therein up and down. These studs are threaded and nuts are provided thereon which can be turned to change the elevation of the studs. At the top, each of these studs is forked as indicated at 62 and 63. In these forks rest the spacing bar 64 which is commonly used as part of the frame of the lawnmower. With the frame of the lawnmower in position as above described the finger 40 is adjusted to bear against the back of the blade of the mower and the grinding wheel is brought to bear against the beveled cutting edge of the blade and then the carriage shown in Figure 3 is moved along the tracks to grind the blade.

In order to bring the blades into correct contact with the grinding wheel, the adjustment shown in Figures 1, 2 and 6 are provided. The frame 45 is mounted on four links 66, 66, 66, 66. These links are all pivotally mounted on the two cross bars 67, 67 which cross bars are supported on the bars 68, 68 which run the length of the frame. As shown in Figure 6, the links 66 are each pivotally mounted on a bolt 68a which passes both through the bars 66 and 67. On this bolt are nuts and between the nuts and the bar 67 is interposed the helical spring 69. By turning the nuts the spring is compressed drawing the links 66 against the bar 67, holding it at any desired angle which is needed to secure the correct elevation of the frame 45.

The frame 45 is then locked in this position by a link 70 which is pivoted to the frame 45. This link 70 has a slot therein which engages a bolt 71 fastened in the crossbar 67. A wing nut 72 is turned on the bolt 71 to clamp the link 70 against the bar 67. In this way the correct elevation of the frame 45 is secured and fixed. Thereafter the forks 65, 62 and 63 are adjusted up or down to finish the alignment of the axis of the cylinder. The carriage that carries the motor and the grinding wheel can run from one end of the tracks 5 and 6 to the other and is held on these tracks by the stops 75, 75 shown in Figure 1.

For the purpose of grinding the stationary blade of the lawnmower the stationary blade and the casting on which it is fastened is removed from the frame of the lawnmower and is set in a frame or jig that is specially provided in this machine which frame will now be described.

This frame comprises the two angles 80 and 81 which angles are suitably fastened together at the ends and at intermediate points and are spaced apart from each other ¼" or more so that bolts 82 and 83 can pass between the two angles. These bolts can be adjusted along the angles and the stationary cutting blades can be laid on the blocks 84 and 85 between the bolts. The upper ends of the bolts 82 and 83 are turned over to form hooks which can engage on the blade 86 to which the casting 86a is fastened permanently by rivets or bolts and is part of the lawn mower, then by turning the nuts 87 and 88 the bolts are drawn down so that the hooks clamp the blade 86 down on the blocks 84 and 85.

The frame comprising the angles 80 and 81 has brackets 89 and 90 thereon extending downwardly and on the bottom of these brackets is supported the bar 91. This bar rests in the forks 62 and 63 shown in Figure 5.

Extending rearwardly from the angles 80 and 81 and firmly attached thereto is the arm 92 on the rear end of which is carried a roller 93 which rests in the yoke or fork 65. The yokes 65, 62 and 63 are adjustable up and down as heretofore described to place the stationary cutting bar in correct alignment so that the cutting edge of it will be exposed to the grinding wheel 27 and the carriage shown in Figure 3 is moved along the tracks 5 and 6.

It will be understood that the special frame shown in Figures 12, 13 and 14 will not be used on the machine when the knives of the cylinder are being ground, but will be placed in the machine and used only when the stationary cutting blade is being ground.

Figure 16:
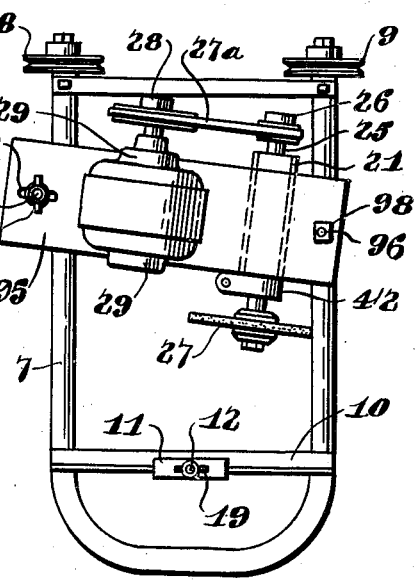
Figure 16 is a top plan view of the assembly shown in Figure 15 with the board carrying the motor and grinding wheel swung in one direction.
Figure 17:
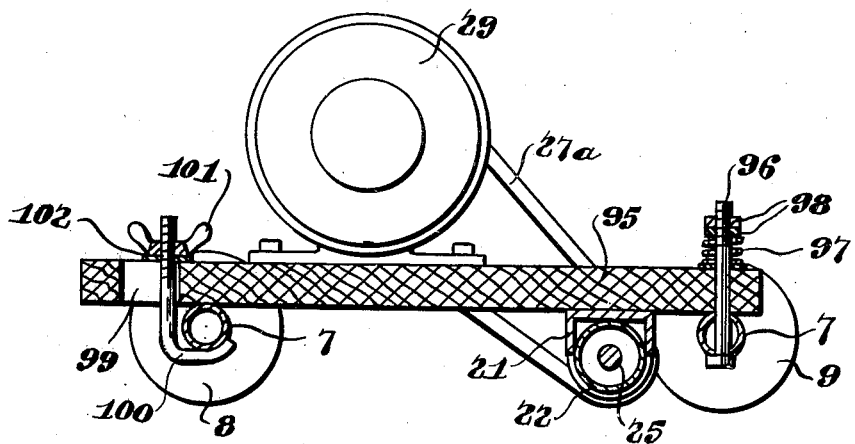
Figure 17 is a sectional view of the assembly shown in Figure 15, the section being taken on the line $17x$, $17x$.

In Figures 15, 16 and 17 I have shown a modification of a support for the assembly and motor of the grinding wheel which is somewhat different from that shown in Figures 1, 2, 3 and 11. In these figures the same U-shaped frame 7 is used with its grooved wheels on one end and the assembly shown in Figure 4 on the other end. As shown in these figures the motor and the shaft of the grinding wheel are mounted on a single board 95 which board is pivotally attached to the frame 7 at the right hand end as shown in Figure 17 so that it can swing on the bolt 96 as a pivot. This bolt passes through the tubular bar of the frame 7 and through the board 95 and the board is clamped in place by the helical spring 97 clamped by nuts 98 it being understood that the bolt 96 is threaded at the upper end.

At the other end this board 95 is slotted as shown at 99 and through this slot projects a hook 100 that engages under the frame 7. The upper end of the hook is threaded and the hook is drawn up tight against the frame 7 by a thumb nut 101. A washer 102 is interposed between the thumb nut and the board 95. As shown in Figures 15 and 16, the board 95 can be swung from the middle position shown in Figure 15 either to the right or to the left by loosening the bolt 96 and the hook 100 and after the board is in the correct position the bolt and hook can be tightened in place so as to hold the board and its assembly in its correct position. On this board is the same motor 29 and grinding wheel 27 heretofore described.

It will be understood that the same belt 27a is used and the same sleeve 22 and channel 21 are used, it being understood that the sleeve is fastened in the channel by brazing or in any other suitable manner.

I claim:

1. In a machine for sharpening the knives of lawnmowers the combination of a stationary frame, a pair of tracks mounted thereon, a second frame mounted to travel on the stationary frame, said second frame being U-shaped having two grooved wheels suitably spaced apart and engaged with one of the tracks of the stationary frame, said second frame being held to a straight line movement by the engagement of the grooved wheels with the one track, a third wheel on the second frame that engages with the second track, a board supported by said U-shaped frame and pivoted at one end to one side of the frame, a grinding wheel and a motor for driving it being mounted on said board, said board being adapted to swing on said pivot to bring the grinding wheel into any desired engagement with the blade which it is intended to grind and means for supporting the blade on the stationary frame.

2. In a machine for sharpening the knives of lawnmowers the combination of a stationary frame, a pair of tracks mounted thereon, a second frame mounted to travel on the stationary frame, said second frame being U-shaped having two grooved wheels suitably spaced apart and engaged with one of the tracks of the stationary frame, said second frame being held to a straight line movement by the engagement of the grooved wheels with one track, a third wheel on the second frame that engages with the second track, a board supported by said U-shaped frame and pivoted at one end to one side of the frame, a grinding wheel and a motor for driving it being mounted on said board, said board being adapted to swing on said pivot to bring the grinding wheel into any desired engagement with the blade which it is intended to grind, a wide shoe carried on the second frame and bearing against the side of the knife being ground for the purpose of holding a portion of the knife against the grinding wheel as the grinding wheel travels along the knife and means for supporting the blade on the stationary frame.

3. In a machine for sharpening the knives of lawnmowers the combination of a stationary frame, a pair of horizontal tracks mounted thereon, a second frame mounted to travel on the stationary frame, said second frame having a U-shaped member having two parallel arms extending transverse to the tracks, each of said arms having a grooved wheel mounted to rotate on the end thereof, each of said wheels rotating about an axis in line with an arm, said wheels being adapted to engage the track on one side of said stationary frame, a bridge fastened to the parallel arms near the other end of the U-shaped frame, a bracket fastened on said bridge, a wheel mounted to rotate on the lower end of said bracket, said wheel being adapted to run on the track on the other side of said stationary frame, a grinding wheel carried between the tracks on said U-shaped frame on a shaft parallel to the two arms of the U-shaped frame and transverse to and between the tracks, said grinding wheel extending below the tracks, means below the tracks for holding the stationary cutting blade of the lawnmower in parallel relation to the tracks of the stationary frame and means for raising the stationary blade and holding it with its cutting edge in grinding contact with the cylindrical rim of the grinding wheel as the second frame travels on the first frame, the closed end of the U-shaped frame serving as a handle by which the frame can be moved in one direction with the grinding wheel in contact with the knife being ground and by which the closed end of the frame can be lifted to raise the grinding wheel out of contact with the blade and move the grinding wheel in the other direction.

4. In a machine for sharpening the knives of lawnmowers the combination of a stationary frame, a pair of tracks mounted thereon, a second frame mounted to travel on the stationary frame, said second frame being U-shaped and having two parallel arms extending transverse to the tracks and having two grooved wheels mounted to rotate on the open ends of the two arms thereof, said wheels being adapted to engage on one of the tracks of the stationary frame, said second frame being held to a straight line movement by the engagement of the grooved wheels with the one track, a third wheel on the second frame that engages with the second track, a grinding wheel carried on the second frame between the tracks, means for raising or lowering and holding the stationary blade of a lawnmower in parallel relation to and below the tracks of the stationary frame, said grinding wheel having a cylindrical grinding surface, means for holding the stationary blade with its cutting edge in grinding contact with the cylindrical rim of the grinding wheel as the second frame travels on the first frame, means for lowering or raising the second frame on its third wheel to correctly position the grinding wheel on the cutting edge of the knife that is being ground.

5. In a machine for sharpening the knives of lawnmowers, the combination of a stationary frame, a pair of horizontal tracks thereon, a second frame mounted to travel on the stationary frame, said second frame having a U-shaped member, said member having two parallel arms extending transverse to the tracks and a closed end, each of said arms having a grooved wheel mounted to rotate on the end thereof, each of said wheels rotating on its axis in line with its arm, said wheels being adapted to engage the track on one side of said stationary frame, a bridge fastened to the parallel arms near the other end of the U-shaped frame, a bracket fastened on said bridge, a wheel mounted to rotate on the lower end of said bracket, said wheel being adapted to run on the track on the other side of said bridge, a grinding wheel carried on said U-shaped frame between the tracks, the closed end of the U-shaped frame serving as a handle by which the closed end of the U-shaped frame and the grinding wheel can be lifted together and held up as the U-shaped frame is moved along the track.

6. In a machine for sharpening the knives of lawnmowers, a carriage having a U-shaped frame having two parallel legs, a wheel on the open end of each leg, said wheels being in line with each other, a table pivotally connected at one end to one leg, the other end of the table being adapted to slide on and being adapted to be clamped in a number of angular positions on the other leg, a motor mounted on the top of said table, a bearing mounted below said table, a shaft mounted to rotate in said bearing and projecting on the two sides of said table, means for driving said shaft on one side of the table, a grinding wheel carried on said shaft on the other side of the table and extending below the U-shaped frame.

7. In a machine for sharpening the knives of lawnmowers, a carriage having a U-shaped frame having two parallel legs, a wheel on the open end of each leg, said wheels being in line with each other, a table pivotally connected at one end to one leg, the other end of the table being adapted to slide on and being adapted to be clamped in a number of angular positions on the other leg, a motor mounted on the top of said table, a bearing mounted below said table, a shaft mounted to rotate in said bearing and projecting on the two sides of said table, means for driving said shaft on one side of the table, a grinding wheel carried on said shaft on the other side of the table and extending below the U-shaped frame, a cross bar fastened near the closed end of the U-shaped frame, a bracket extending down from said cross bar, a wheel carried on the lower end of said bracket, means for raising and lowering said wheel with reference to the cross bar.

EUGENE F. COMSTOCK.

REFERENCES CITED

The following references are of record in the file of this patent:

UNITED STATES PATENTS

| Number | Name | Date |
|---|---|---|
| 348,753 | LeRoy | Sept. 7, 1886 |
| 946,635 | Franke | Jan. 18, 1910 |
| 950,560 | Root | Mar. 1, 1910 |
| 1,053,389 | Hedstrom | Feb. 18, 1913 |
| 1,097,267 | Schleged | May 19, 1914 |
| 1,344,168 | Brown | June 22, 1920 |
| 1,448,518 | Brown | Mar. 13, 1923 |
| 1,448,519 | Brown | Mar. 13, 1923 |
| 1,605,890 | Brown | Nov. 2, 1926 |
| 1,820,777 | Calhoun | Aug. 25, 1931 |
| 1,847,045 | Evans | Feb. 23, 1932 |
| 2,180,911 | Rogers | Nov. 21, 1939 |
| 2,187,289 | Utterback | Jan. 16, 1940 |
| 2,279,798 | Shelburne | Apr. 14, 1942 |
| 2,281,055 | Smith | Apr. 28, 1942 |
| 2,286,970 | Maynard | June 16, 1942 |
| 2,377,126 | Brown | May 29, 1945 |